(12) United States Patent
Hino et al.

(10) Patent No.: US 8,769,255 B2
(45) Date of Patent: Jul. 1, 2014

(54) INFORMATION PROCESSING SYSTEM AND METHOD OF EXECUTING FIRMWARE

(75) Inventors: Mitsuaki Hino, Kawasaki (JP); Toshio Hosoi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 565 days.

(21) Appl. No.: 12/356,521

(22) Filed: Jan. 20, 2009

(65) Prior Publication Data

US 2009/0187745 A1 Jul. 23, 2009

(30) Foreign Application Priority Data

Jan. 18, 2008 (JP) .................. 2008-008935

(51) Int. Cl.
*G06F 9/00* (2006.01)
*G06F 9/445* (2006.01)
*G06F 9/44* (2006.01)

(52) U.S. Cl.
CPC ............... *G06F 9/4401* (2013.01); *G06F 8/60* (2013.01)
USPC .............................................. 713/2; 717/178

(58) Field of Classification Search
CPC ............ G06F 9/44; G06F 9/4401; G06F 8/60
USPC ....................... 713/2; 717/169, 178
See application file for complete search history.

(56) References Cited

U.S. PATENT DOCUMENTS

| | | | |
|---|---|---|---|
| 6,195,171 B1 * | 2/2001 | Ochiai | 358/1.15 |
| 6,615,404 B1 * | 9/2003 | Garfunkel et al. | 717/173 |
| 7,296,055 B2 | 11/2007 | Nomura et al. | |
| 7,822,957 B2 * | 10/2010 | Takahashi | 713/1 |
| 2003/0086107 A1 | 5/2003 | Johnson et al. | |
| 2005/0240686 A1 * | 10/2005 | Kashiwagi | 710/8 |
| 2006/0085566 A1 * | 4/2006 | Lee | 710/8 |
| 2006/0221684 A1 | 10/2006 | Iwai | |
| 2007/0055858 A1 | 3/2007 | Takahashi | |
| 2008/0307157 A1 * | 12/2008 | Jang et al. | 711/103 |

FOREIGN PATENT DOCUMENTS

| | | |
|---|---|---|
| JP | 2003-85065 | 3/2003 |
| JP | 2003-208324 | 7/2003 |
| JP | 2006-255955 A | 9/2006 |
| JP | 2007-72532 A | 3/2007 |

OTHER PUBLICATIONS

"Japanese Office Action" mailed by JPO on Jun. 26, 2012 and corresponding to Japanese Application No. 2008-008935, with partial English translation.

* cited by examiner

*Primary Examiner* — Chun Cao
(74) *Attorney, Agent, or Firm* — Fujitsu Patent Center

(57) ABSTRACT

An information processing system includes a control central processing unit a memory; and a stream interface configured to receive an input stream including data to be processed and to transfer the input stream to the memory. A download process in which the stream interface receives stream data including firmware and stores the stream data in the memory is executed in response to an instruction from the control central processing unit, and the control central processing unit analyzes the stream data stored in the memory to extract the firmware in the memory space and executes the firmware extracted in the memory space to process the data to be processed.

15 Claims, 11 Drawing Sheets

INFORMATION PROCESSING SYSTEM AND METHOD OF EXECUTING FIRMWARE

CROSS-REFERENCE TO RELATED APPLICATIONS

This application is based upon and claims the benefit of priority of the prior Japanese Patent Application No. 2008-008935, filed on Jan. 18, 2008, the entire contents of which are incorporated herein by reference.

FIELD

The embodiments discussed herein are directed to an information processing system.

BACKGROUND

Information processing systems adopting image processing technologies and audio processing technologies have higher performances and functions with the increasingly advanced image and audio processing technologies. This is followed by an increase in the circuit size of the hardware of the information processing systems and in the amount of software code thereof.

FIG. 1 is a block diagram showing an example of the configuration of an image processing system in which a dedicated image processing apparatus is connected to a host apparatus (system controller). An information processing system having a high-performance image processing function can be realized with such a configuration using the hardware dedicated to image processing. Referring to FIG. 1, the image processing system includes a host apparatus 10, an image processing apparatus 11, a bridge 12, an external storage apparatus 13, and a synchronous dynamic random access memory (SDRAM) 14. The image processing apparatus 11 includes a host interface 21, which is a serial interface, a demultiplexer (DEMUX) 22 serving as a stream interface, a control central processing unit (CPU) 23, a video processor 24, and a SDRAM interface 25.

In the image processing system in FIG. 1, the host apparatus 10 is connected to the image processing apparatus 11 via the serial interface and the image processing apparatus 11 performs the image processing under the control of the host apparatus 10. In the example of the configuration in FIG. 1, firmware for the image processing is firstly transferred from the host apparatus 10 to the image processing apparatus 11 through a serial port. Then, the image processing apparatus 11 is caused to execute the transferred firmware in order to perform a variety of processing concerning image data. The variety of processing includes transferring image data from the external storage apparatus 13 to the image processing apparatus 11 through the stream interface.

FIG. 2 is a flowchart showing an example of a process of downloading the firmware through the serial interface in the configuration shown in FIG. 1. The firmware is downloaded from the host apparatus 10 to the image processing apparatus 11 in accordance with the process shown in FIG. 2 at startup of the image processing system, and the downloaded firmware is booted up to activate the image processing apparatus 11.

Specifically, after the image processing apparatus 11 is turned on, the control CPU 23 in the image processing apparatus 11 starts to execute a boot loader. The boot loader is a control program stored in a read only memory (ROM) 26 (refer to FIG. 1) connected to the control CPU 23. The control CPU 23 firstly executes the control program after the image processing apparatus 11 is turned on.

Referring to FIG. 2, in Step S1, the execution of the boot loader causes the control CPU 23 to assert an interruption signal to an interruption terminal of the host apparatus 10 through the host interface 21. In Step S2, the host apparatus 10 waits for an interruption while determining whether an interruption occurs. If an interruption from the image processing apparatus 11 occurs, then in Step S3, the host apparatus 10 transfers the firmware to the image processing apparatus 11 through the serial port in response to the interruption. Specifically, the host apparatus 10 reads out the firmware from the external storage apparatus 13 and transfers the read-out firmware to the image processing apparatus 11 through the serial port.

FIG. 3 illustrates an example of the format of the firmware to be downloaded. Referring to FIG. 3, firmware 30 includes a header part 31 and multiple data block parts 32-1 to 32-$n$ ($n$ denotes an integer that is equal to two or more). The header part 31 includes an entry address 33 and a block count 34 in its header area. The entry address 33 indicates the execution start address of the firmware stored in the memory area. The block count 34 indicates the number $n$ of blocks. Each of the data block parts 32-1 to 32-$n$ includes a top address 35 and a byte count 36 in its block header area. The top address 35 indicates the address where the corresponding data block part is positioned in the memory area. The byte count 36 indicates the amount of data in the body of the corresponding data block part (the data section) in units of bytes.

Referring back to FIG. 2, in Step S4, the control CPU 23 that is executing the boot loader analyzes the firmware 30 (serial data) received through the host interface 21, which is the serial interface. In Step S5, the control CPU 23 transfers the firmware body in the data section of the corresponding data block to the top address 35 set in the header of each of the data block parts 32-1 to 32-$n$ based on the result of the analysis. Specifically, the control CPU 23 writes the data in the firmware in the SDRAM 14 through the SDRAM interface 25. In Step S6, the control CPU 23 determines whether the reception of the firmware including the amount of data specified in the block count 34 and the byte count 36 in the firmware 30 is completed or not based on the result of the analysis.

When the reception of the firmware is completed, then in Step S7, the control is moved from the boot loader to the firmware. Specifically, the control CPU 23 sets a program pointer at the execution start address indicated by the entry address 33 in the header part 31 in the firmware 30 to start execution of the firmware. In Step S8, the execution of the firmware causes the control CPU 23 to assert an interruption signal to the interruption terminal of the host apparatus 10 through the host interface 21. The image processing apparatus 11 notifies the host apparatus 10 of the completion of the boot-up with the interruption. The host apparatus 10 starts certain processing in response to the notification of the completion of the boot-up.

A serial communication interface, such as a general-purpose RS-232C/UART/I2C, is generally used as the serial interface through which the firmware 30 is downloaded in the above configuration. However, since the data transfer speed of such a serial communication interface is relatively low, there is a problem in that it takes a longer time to download the firmware when the performance of the information processing apparatus is improved to increase the size of the firmware. Although the firmware may be downloaded from, for example, an external-attached flash memory, the number of pins and/or the cost of the parts are undesirably increased in such a configuration.

Such a technology is disclosed in, for example, Japanese Laid-open Patent Publication No. 2007-72532.

SUMMARY

It is an aspect of the embodiments discussed herein to provide an information processing system including a control central processing unit, a memory, and a stream interface configured to receive an input stream including data to be processed and to transfer the input stream to the memory. A download process in which the stream interface receives stream data including firmware and stores the stream data in the memory is executed in response to an instruction from the control central processing unit, and the control central processing unit analyzes the stream data stored in the memory to extract the firmware in the memory space and executes the firmware extracted in the memory space to process the data to be processed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will herein be described in detail with reference to the attached drawings.

Figure 1:
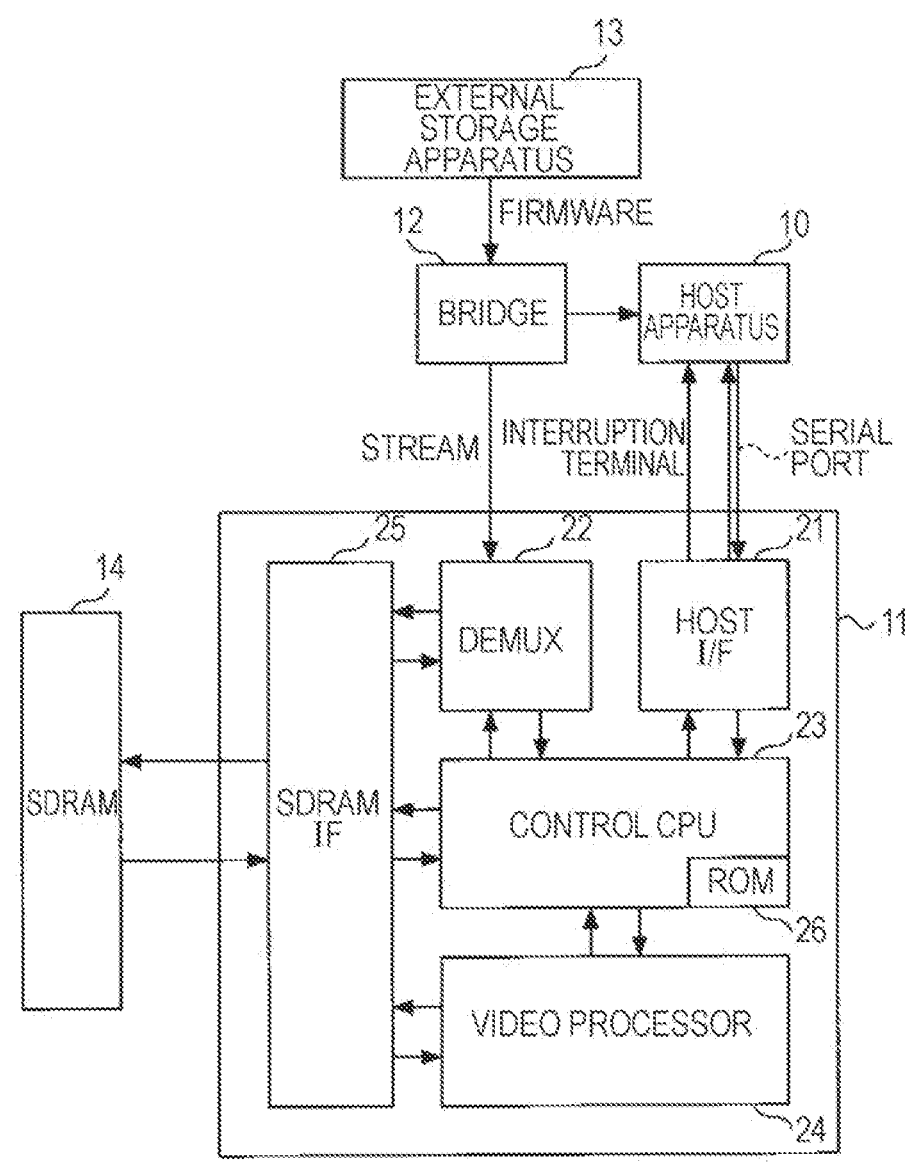
FIG. 1 is a block diagram illustrating an example of the configuration of an image processing system in which a dedicated image processing apparatus is connected to a host apparatus.

The configuration of the image processing system illustrated in FIG. 1 can be used as an embodiment of an information processing system. However, the content of the information processing is not restricted to specific information processing, such as the image processing, and the information processing system according to the embodiment may execute arbitrary information processing. For example, the information processing system according to the embodiment may be an audio processing system or a video-audio processing system.

The DEMUX 22 in FIG. 1 divides a reception stream into multiple streams. For example, the DEMUX 22 divides the reception stream into a video stream and an audio stream and stores the video data and the audio data in the corresponding buffers (for example, the corresponding memory areas in the SDRAM 14). The video data and the audio data read out from the buffers are decoded by the corresponding decoders. In the configuration illustrated in FIG. 1, only the video processor 24 is illustrated as the image processing part of the information processing system and the video processor 24 performs the image decoding process.

For example, streams defined for Moving Picture Experts Group (MPEG)-1 systems and streams defined for MPEG-2 systems are used according to the MPEG. In the MPEG, a stream is divided into a video data stream and an audio data stream which are called "elementary streams." An elementary stream is divided into units called packets thus composing a packetized elementary stream. A packet header is added to each packet. The packet header includes a code used for identifying the stream, information about the size of the packet, and time information for synchronous playback, such as a presentation time stamp (PTS) or a decoding time stamp (DTS). An arbitrary number of packets compose a pack. System Clock Reference (SCR), which is reference time information, is described in a pack header added to each pack. Configuring the system stream in units of packs allows the reception side to start the playback at a midpoint of the stream before the entire stream is received.

In the case of the MPEG-1, one stream resulting from multiplexing of the video data and the audio data is called a "system stream." In the case of the MPEG-2, one stream resulting from multiplexing of the video data and the audio data is called a "program stream." Only one program is included in one program stream. In contrast, a format in which multiple program streams are included in one stream is called a "transport stream," which is used for broadcasting or in a communication network. It is assumed in the following description that the transport stream in MPEG-2 is used.

Figure 4:
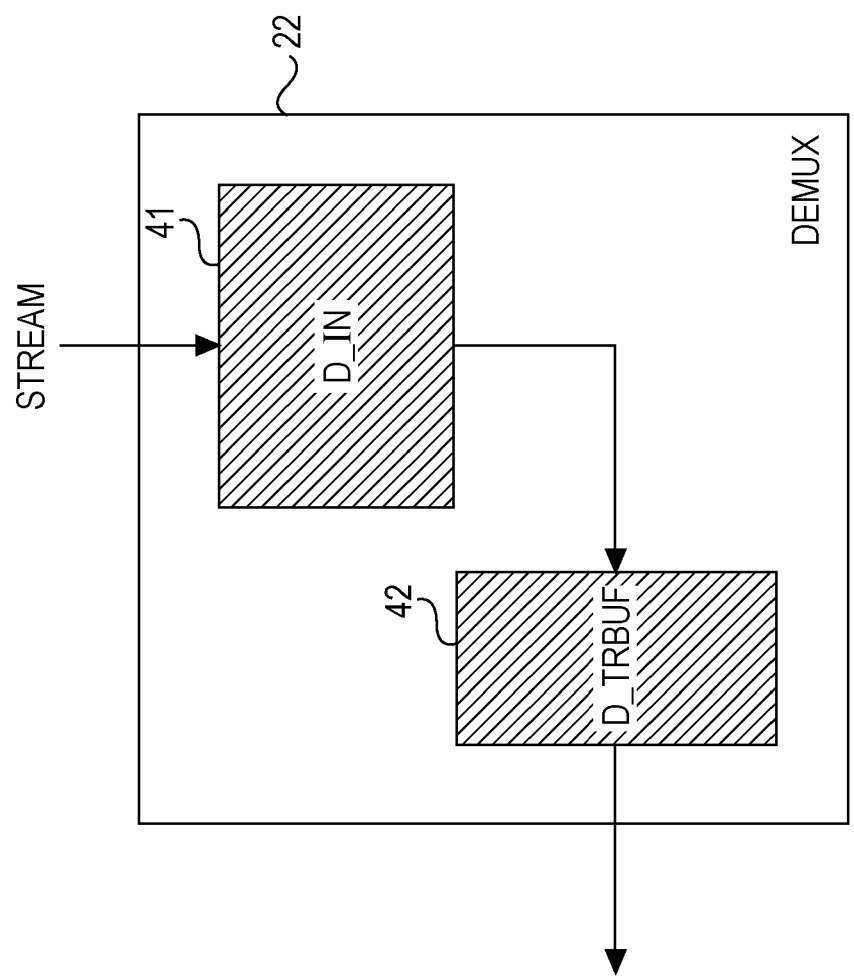
FIG. 4 illustrates an example of the functional block configuration of a DEMUX.

FIG. 4 illustrates an example of the functional block configuration of the DEMUX 22. Referring to FIG. 4, the DEMUX 22 includes a D_IN part 41 and a D_TRBUF part 42. The D_IN part 41 is a module in which the stream is inputted. The D_IN part 41 detects a specified code (for example, 0x47) included in the input stream to establish synchronization. Superimposition of the stream data on a system time clock (STC), which is the reference clock of the image processing apparatus 11, is performed in the D_IN part 41. The D_TRBUF part 42 has a direct memory access (DMA) function. The D_TRBUF part 42 independently accesses the memory to transfer stream data to a destination buffer by using the DMA function. The data dividing function of the DEMUX 22 is realized by dividing the stream, as needed, when the stream is transferred to the buffer, and by allocating the data items resulting from the division to the respective destinations.

As described above, the image processing apparatus 11, which receives the stream of image data, establishes the synchronization, and transfers the stream to the destination buffer by using the DMA function, is provided with the DEMUX 22 in advance. In other words, the stream interface (the DEMUX 22 in this example) that receives data to be subjected to the information processing (image data in this example) as the stream and transfers the stream to the memory by using the DMA function is provided in advance in the information processing apparatus (the image processing apparatus 11 in this example). Such a stream interface is a high-speed interface capable of receiving a large amount of data (image data and/or audio data) to be processed at high speed and transferring the data to the buffer. The data transfer speed of the DEMUX 22 is markedly higher than that of the host interface 21, which is a serial interface such as the RS-232C/UART/I2C. In the information processing apparatus in the embodiment, such a stream interface (the DEMUX 22 in the example in FIG. 1) is used for downloading the firmware as described below in detail.

Figure 2:
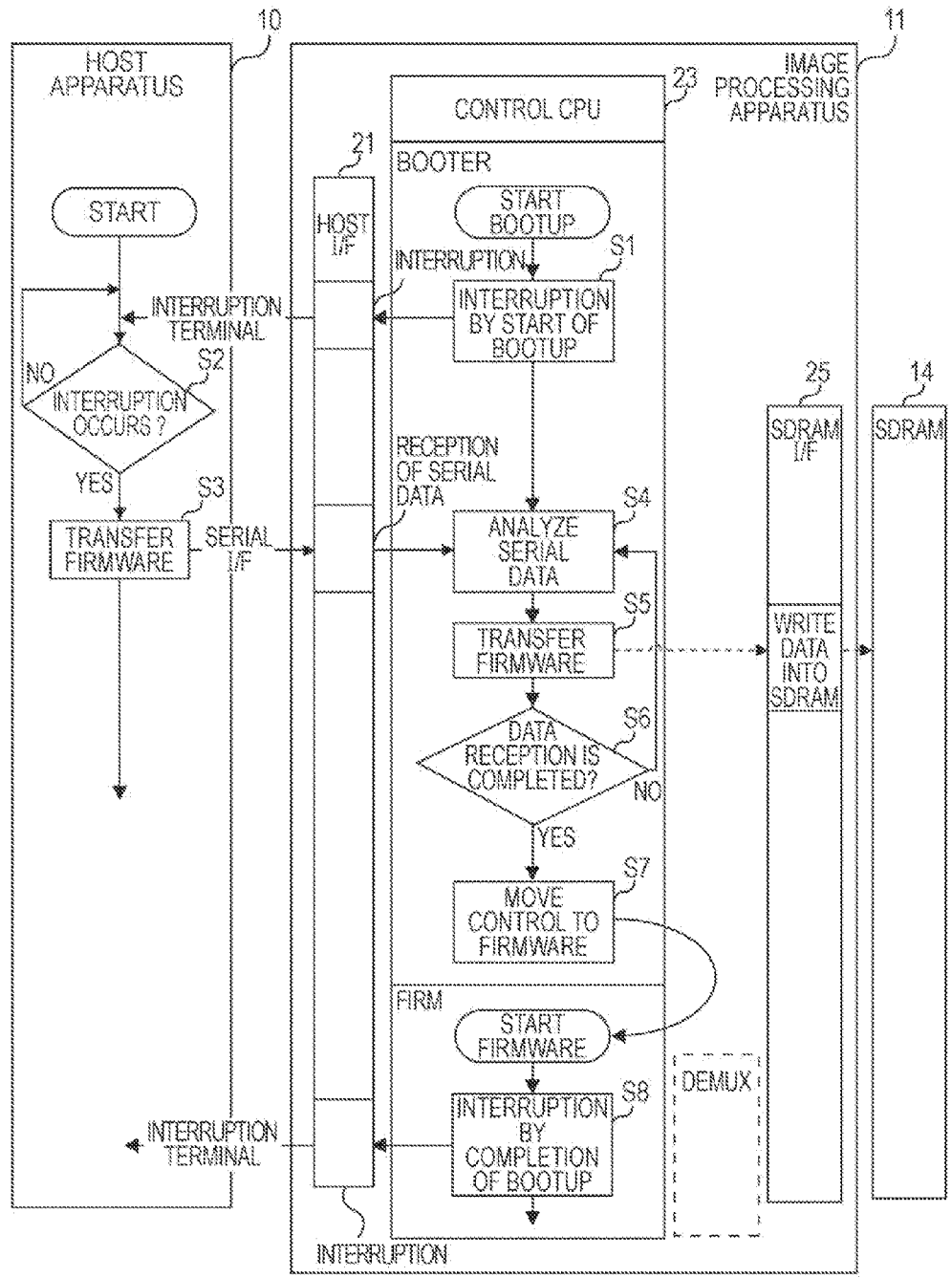
FIG. 2 is a flowchart illustrating an example of a process of downloading firmware through a serial interface in the configuration shown in FIG. 1.

The DEMUX 22 does not have a data analyzing function, unlike the control CPU 23, and can only store the received stream data in the SDRAM 14 without analysis. When the control CPU 23 receives the firmware through the host interface 21, which is the serial interface, as in the case described with reference to FIG. 2, the control CPU 23 is capable of writing the firmware body in the data section of each data block at the top address 35 set in the header of each of the data block parts 32-1 to 32-n. In other words, the control CPU 23 is capable of appropriately extracting the firmware in the memory space based on the result of the analysis of the header. However, when the DEMUX 22 is used for receiving the firmware and storing the firmware in the memory, the received stream data is only directly written in the memory and it is not possible to expand the firmware in the memory space based on the result of the analysis of the header. Accordingly, after the DEMUX 22 writes the received stream data in the SDRAM 14, it may be necessary for the control CPU 23 to read out the received stream data from the SDRAM 14 and to analyze the header to appropriately extract the firmware in the memory space.

As described above, the information processing system according to the embodiment includes the control CPU the control CPU 23 and the stream interface (the DEMUX 22) receiving the input stream including data to be processed and transferring the stream to the memory. In this configuration, a download process in which the stream interface (the DEMUX 22) receives the stream data including the firmware and stores the stream data in the memory (the SDRAM 14) is performed in response to an instruction from the control CPU (the control CPU 23). The control CPU (the control CPU 23) analyzes the stream data stored in the memory to extract the firmware in the memory space. In addition, the control CPU (the control CPU 23) executes the firmware extracted in the memory space to process the data to be processed (the image data in this example).

Although the SDRAM 14 is an externally-attached memory of the image processing apparatus 11 in the example of the configuration shown in FIG. 1, a DRAM may be included in the image processing apparatus 11 as a local memory. In this case, the memory space resulting from combining the local memory with the SDRAM 14 is used as the memory space in which the firmware is extracted. Which memory, the local memory or the SDRAM 14, the firmware is practically extracted in or which part of the firmware is selectively extracted in the local memory when part of the firmware is extracted in the local memory and the remaining part of the firmware is extracted in the SDRAM 14 is appropriately determined when the system is designed.

The information processing system according to the embodiment may further include the serial interface (the host interface 21) coupled to the host apparatus 10. In this configuration, the control CPU 23 receives a download program from the host apparatus 10 through the serial interface (the host interface 21) and executes the download program to perform the download process. The control CPU 23 is capable of receiving a small download program through the serial interface and executing the download program to receive the large firmware through the stream interface (the DEMUX 22) in this configuration. With such a configuration, the address of a destination can be specified by the download program when the control CPU 23 receives the stream data including the firmware and stores the stream data in the memory (the SDRAM 14). Accordingly, it is possible to achieve a flexible download process depending on the configuration of the system.

The information processing system according to the embodiment may further include a ROM 26 for booting. In this configuration, the control CPU 23 executes the download program stored in the ROM 26 for booting to perform the download process. With this configuration, it is possible to achieve the download process with simple control.

Figure 5A:
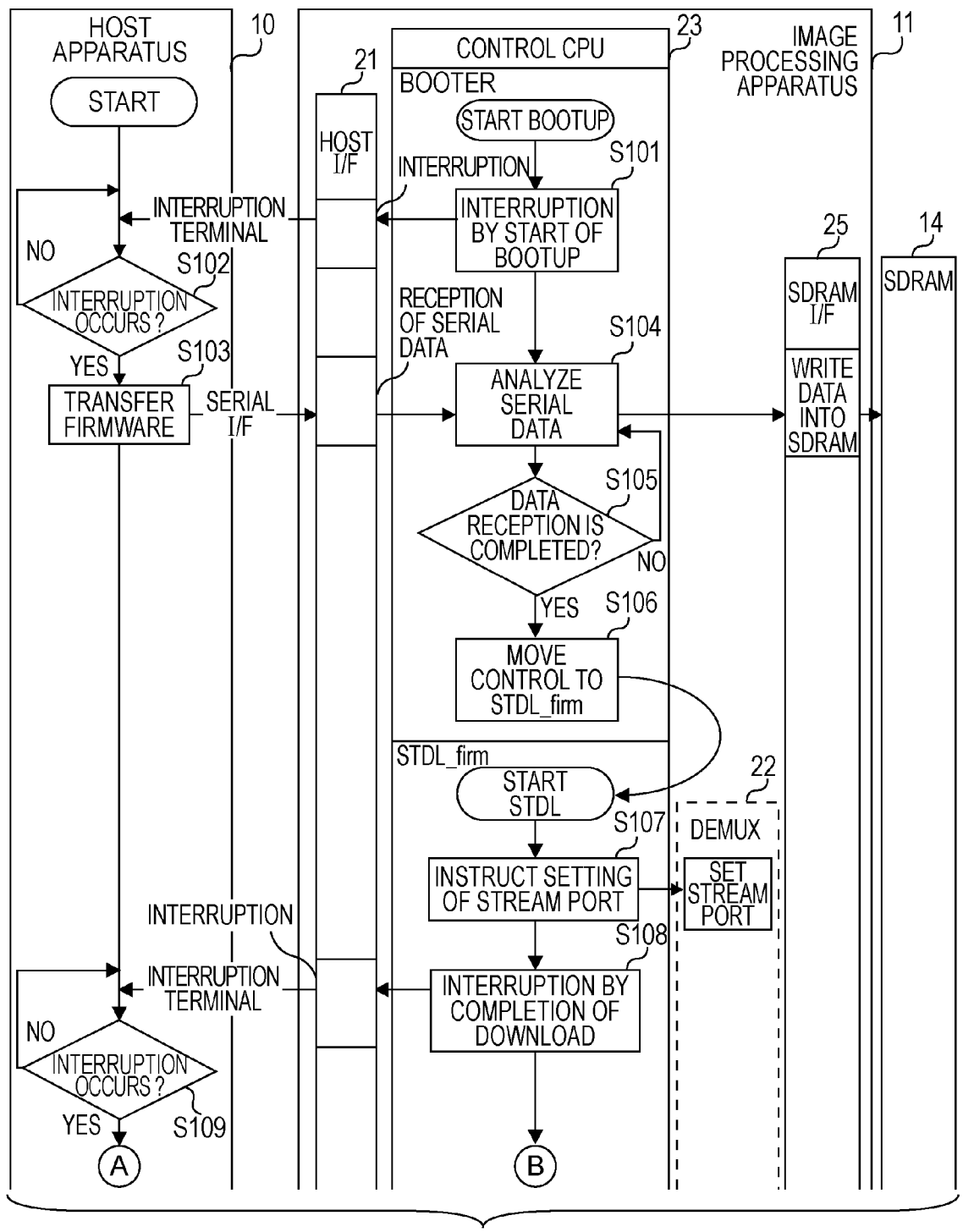
FIGS. 5A and 5B are diagrams illustrating a flowchart of a process of downloading the firmware through a stream interface in the configuration shown in FIG. 1 according to an embodiment.
Figure 5B:
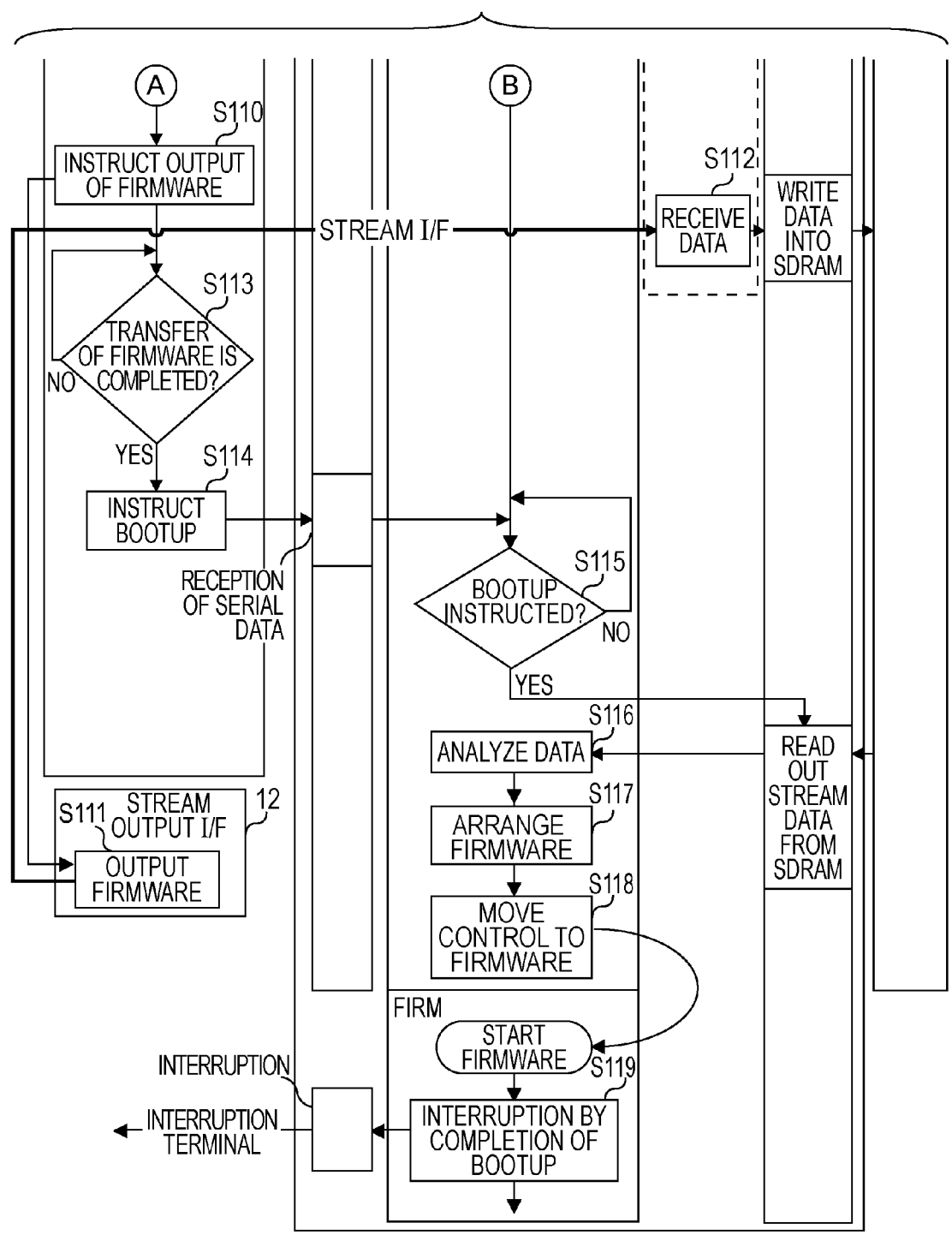

FIGS. 5A and 5B are diagrams showing a flowchart of a process of downloading the firmware through the stream interface in the configuration shown in FIG. 1 according to an embodiment. At startup of the information processing system, the firmware is downloaded from the host apparatus 10 to the image processing apparatus 11 and is booted up to activate the image processing apparatus 11 in accordance with the process shown in FIGS. 5A and 5B.

Specifically, after the image processing apparatus 11 is turned on, the control CPU 23 in the image processing apparatus 11 starts to execute a boot loader. The boot loader is a control program stored in the ROM 26 coupled to the control CPU 23. The control CPU 23 first executes the control program after the image processing apparatus 11 is turned on.

Referring to FIG. 5A, in Step S101, when the boot loader is executed, the execution of the boot loader causes the control CPU 23 to assert an interruption signal to the interruption terminal of the host apparatus 10 through the host interface 21. In Step S102, the host apparatus 10 waits for an interruption while determining whether an interruption occurs or not. If an interruption from the image processing apparatus 11 occurs, then in Step S103, the host apparatus 10 transfers the first firmware (download program) to the image processing apparatus 11 through the serial port in response to the interruption. Specifically, the host apparatus 10 reads out the first firmware from the external storage apparatus 13 and transfers the readout first firmware to the image processing apparatus 11 through the serial port.

Figure 3:
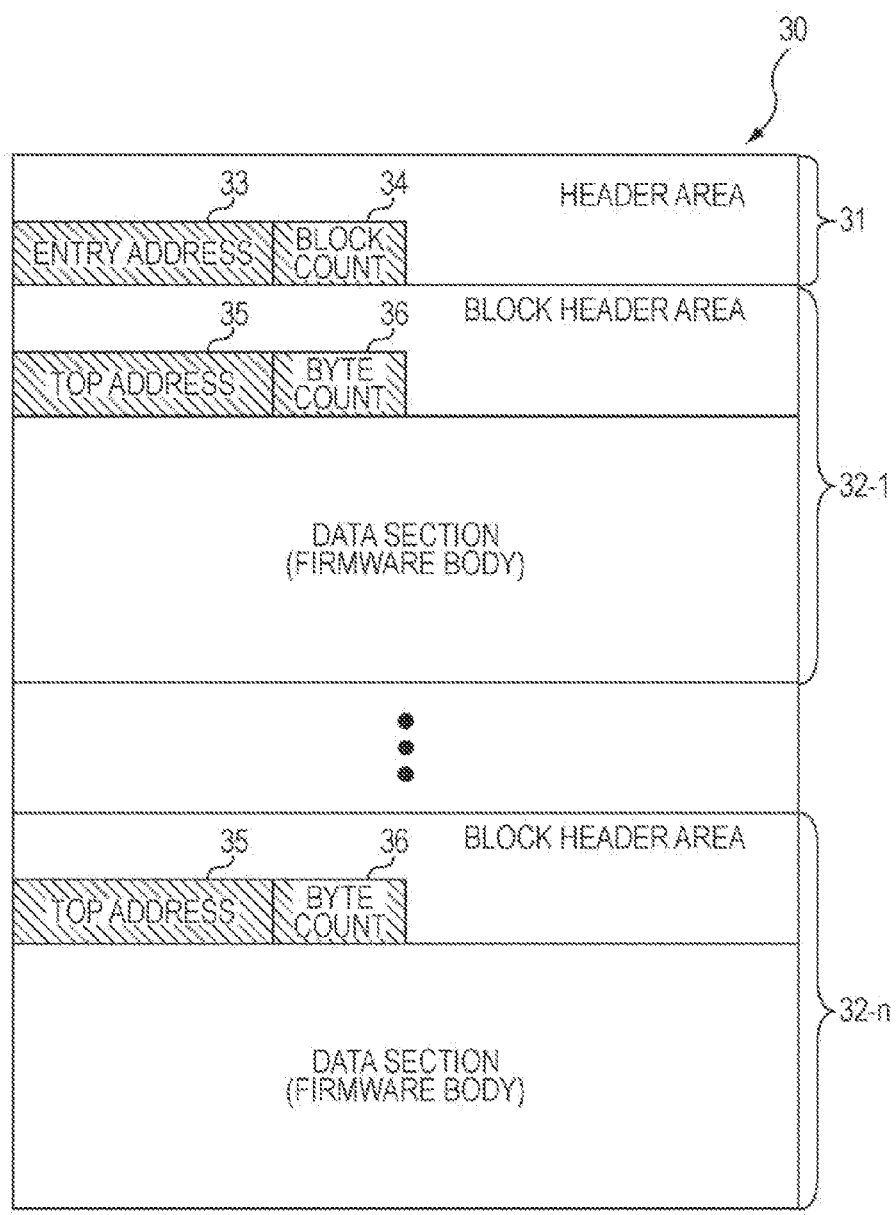
FIG. 3 illustrates an example of the format of the firmware to be downloaded.

The first firmware to be downloaded has a format similar to the one illustrated in FIG. 3. In Step S104, the control CPU 23 that is executing the boot loader analyzes the first firmware (serial data) received through the host interface 21, which is the serial interface. The control CPU 23 stores the body of the first firmware in the data section of the corresponding data block at the top address set in the header of each of the data block parts based on the result of the analysis. Specifically, the control CPU 23 writes the data in the first firmware in the SDRAM 14 through the SDRAM interface 25. In Step S105, the control CPU 23 determines whether or not the reception of the firmware including the amount of data specified in the block count and the byte count in the first firmware is completed based on the result of the analysis.

When the reception of the first firmware is completed, then in Step S106, the control is moved from the boot loader to the first firmware (download firmware STDL_firm). Specifically, the control CPU 23 sets the program pointer at the execution start address indicated by the entry address in the header part in the first firmware to start execution of the first firmware. The execution of the first firmware (that is, the download program) causes the second firmware (data processing firmware) to be downloaded in a manner described below.

When the execution of the first firmware (the download firmware STDL_firm) is started, the control CPU 23 instructs the DEMUX 22 to set a stream port. As described above, the DEMUX 22 detects the specified code in the input stream to establish the synchronization (the synchronization detecting function) and superimposes the stream data on the STC, which is the reference clock of the image processing apparatus 11. Since these functions are not necessary to download the second firmware (data processing firmware), in Step S107, the control CPU 23 sets the stream port so as to disable these functions before instructing the execution of the download process.

The stream interface (the DEMUX 22) in the image processing apparatus 11 has, for example, a clock terminal of one bit, a data terminal of eight bits, an enable terminal of one bit, a PSTART terminal of one bit, and a WAIT terminal of one bit. The stream data is input in the image processing apparatus 11 through the data terminal in synchronization with a transfer clock input in the image processing apparatus 11 through the clock terminal. A signal input through the enable terminal indicates the validity period of the stream data. A signal input through the PSTART terminal indicates the first byte of each packet in the stream data. A transfer wait signal is output through the WAIT terminal in a burst transfer mode. These terminals are set by the first firmware. The settings for the WAIT and PSTART terminals are not necessarily made.

Referring back to FIG. 5A, when the setup of the stream port is completed, then in Step S108, the control CPU 23 asserts an interruption signal to the interruption terminal of the host apparatus 10 through the host interface 21. In Step S109, the host apparatus 10 waits for an interruption while determining whether an interruption occurs or not. If an interruption from the image processing apparatus 11 occurs, then in Step S110 in FIG. 5B, the host apparatus 10 instructs the stream output interface (the bridge 12 in FIG. 1) to output the firmware in response to the interruption. In Step S111, the stream output interface outputs the stream data including the second firmware in response to the instruction. In Step S112, the DEMUX 22 in the image processing apparatus 11 receives the stream data and directly writes the received stream data in the SDRAM 14 through the SDRAM interface 25. In other words, when the stream interface receives the stream data and stores the received stream data in the memory, none of the DEMUX 22 and the control CPU 23 analyzes the content of the stream data.

The stream data including the second firmware has a format similar to the one shown in FIG. 3. In this case, since the DEMUX 22 does not analyze the content of the header, the stream data having the format shown in FIG. 3 is stored in the SDRAM 14. The stream data is stored at the address specified by the first firmware (the download program).

When the transfer of the stream data including the second firmware is completed, then in Step S113, the host apparatus 10 determines whether a certain time period during which the transfer of the stream data will be completed has elapsed or not since the instruction to output the firmware was issued based on the clocking operation by the clock. After the certain time period has elapsed, then in Step S114, the host apparatus 10 instructs the image processing apparatus 11 to execute boot-up. In Step S115, the control CPU 23 waits for the instruction while determining whether or not the instruction for the boot-up is received. If the instruction for the boot-up is received from the host apparatus 10 through the host interface 21, then in Step S116, the control CPU 23 reads out the received stream data from the SDRAM 14 through the SDRAM interface 25 in response to the instruction for the boot-up and analyzes the stream data. In Step S117, the control CPU 23 extracts the second firmware in the memory space based on the result of the analysis. Specifically, the control CPU 23 arranges the second firmware in the data section of the corresponding data block at the top address set in the header of each data block part.

Figure 6:
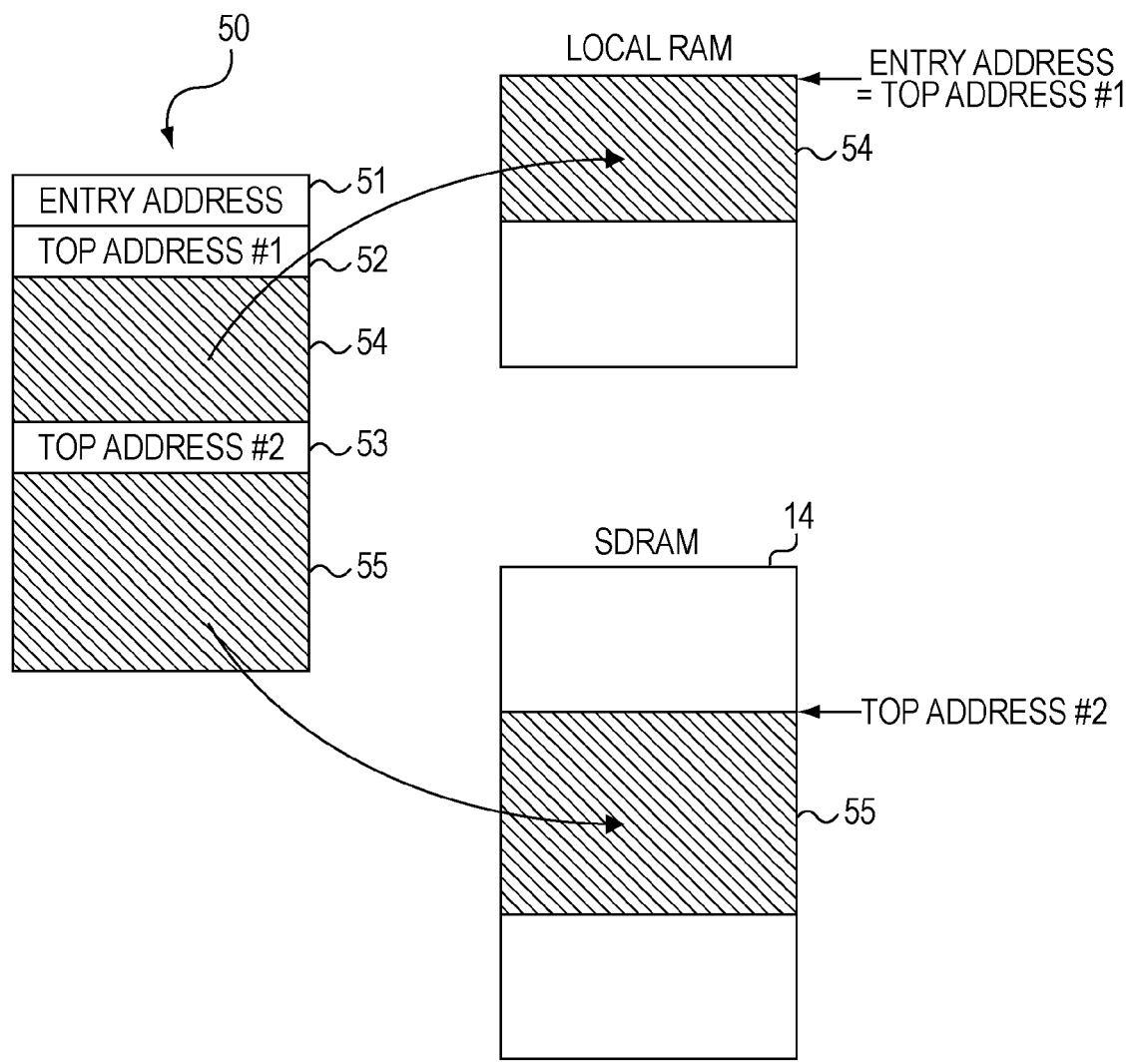
FIG. 6 is a diagram for description of how to extract the firmware included in stream data in a memory space.

FIG. 6 is a diagram for description of how to extract the firmware included in the stream data in the memory space. A case is shown in FIG. 6 for simplicity in which two data blocks are included in the stream data. Referring to FIG. 6, stream data 50 that is received includes an entry address 51, a top address 52 corresponding to the first data block (top address #1), a top address 53 corresponding to the second data block (top address #2), a firmware part 54 that is the data of the first data block, and a firmware part 55 that is the data of the second data block. The stream data 50 received by the DEMUX 22 is directly stored in the SDRAM 14.

The control CPU 23 reads out the stream data 50 from the SDRAM 14 in order to extract the firmware in the memory space. The control CPU 23 analyzes the stream data 50 to identify the entry address 51, the top address 52 (top address #1), and the top address 53 (top address #2). The control CPU 23 writes the firmware part 54, which is the data of the first data block, in the top address #1 (equivalent to the entry address) in the memory space and writes the firmware part 55, which is the data of the second data block, in the top address #2 in the memory space. In other words, the control CPU 23 analyzes the stream data stored in the memory to extract each block of the firmware in the area beginning with the top address in the memory space. The extraction of the firmware in the memory space is performed in the above manner.

Referring back to FIG. 5B, when the extraction of the second firmware in the memory space is completed, then in Step S118, the control is moved from the data analysis and extraction process to the second firmware. Specifically, the control CPU 23 sets the program pointer at the execution start address indicated by the entry address 51 included in the stream data 50 to start execution of the second firmware. In Step S119, the execution of the second firmware causes the control CPU 23 to assert an interruption signal to the interruption terminal of the host apparatus 10 through the host interface 21. The image processing apparatus 11 notifies the host apparatus 10 of the completion of the boot-up with the interruption. The host apparatus 10 starts certain processing in response to the notification of the completion of the boot-up.

The host apparatus 10 executes, for example, a process of transferring image data to the image processing apparatus 11. At this time, the control CPU 23 is executing the second firmware in the image processing apparatus 11 and the operation of the image processing apparatus 11 is controlled by the second firmware.

Figure 7A:
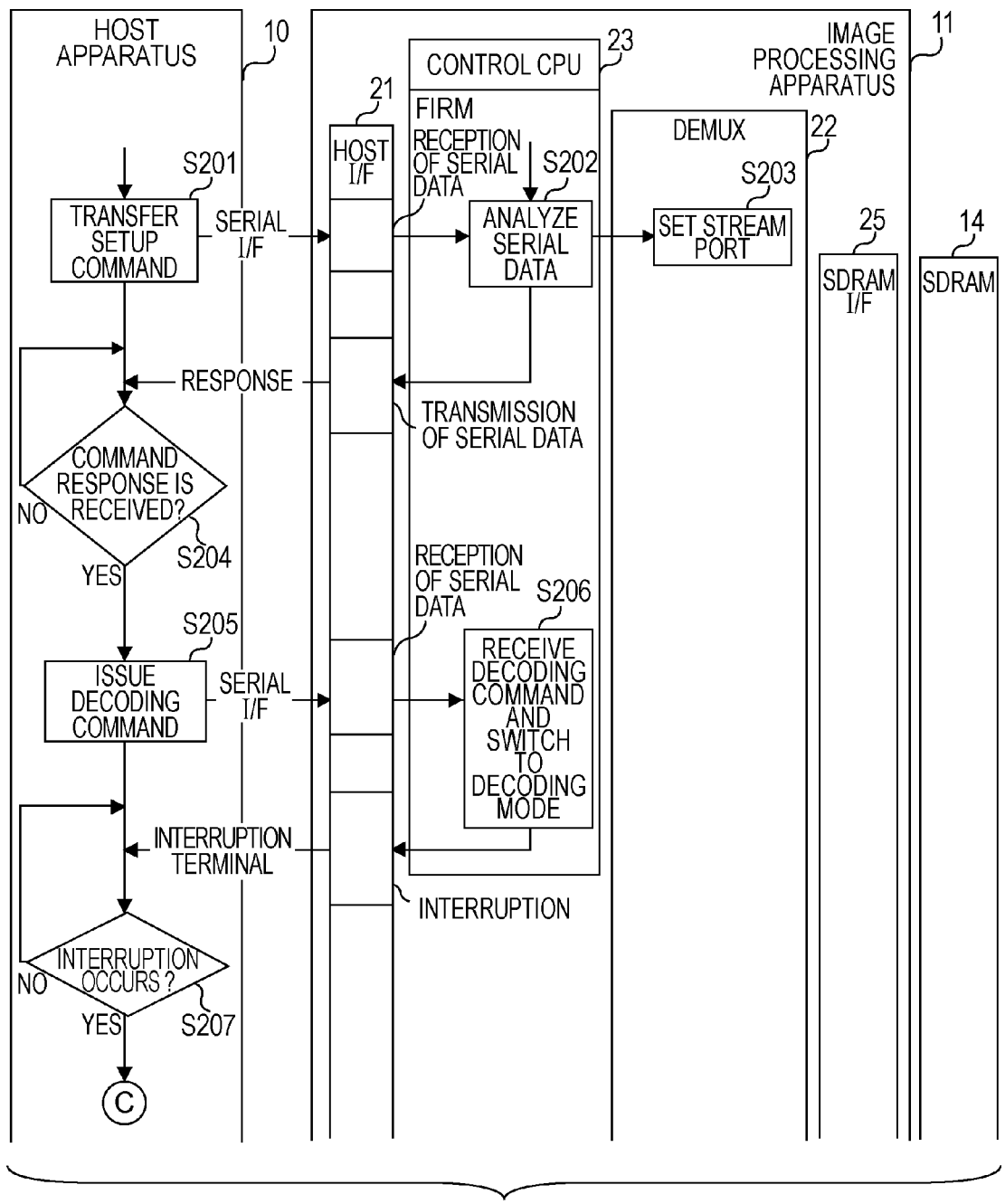
FIGS. 7A and 7B are diagrams illustrating a flowchart of a process of transferring image data to an image processing apparatus according to an embodiment.
Figure 7B:
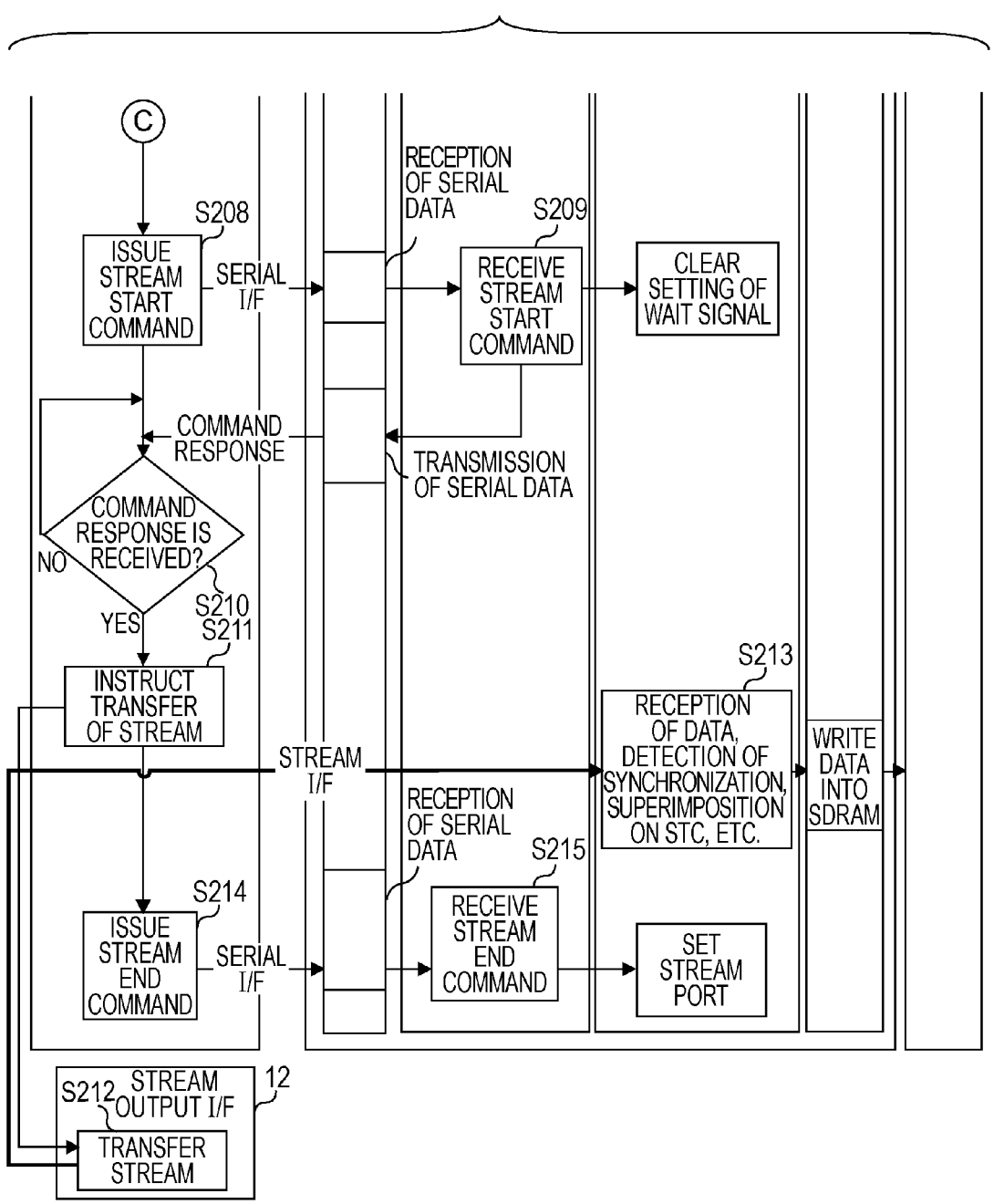

FIGS. 7A and 7B are diagrams illustrating a flowchart of the process of transferring image data to the image processing apparatus 11 according to an embodiment. Referring to FIG. 7A, in Step S201, the host apparatus 10 transfers a setup command to the image processing apparatus 11. The command transmitted from the host apparatus 10 is received through the host interface 21 and is supplied to the control CPU 23. At this time, since the control CPU 23 is executing the second firmware and a serial application program interface (API) of the host interface 21 is enabled, various commands can be received. In contrast, before the second firmware is executed, only the transfer of the first firmware (Step S103 in FIG. 5A) and the instruction for boot-up (Step S114 in FIG. 5B) can be received.

In Step S202, the control CPU 23 analyzes the received serial data. In Step S203, the control CPU 23 sets the stream port of the DEMUX 22 in accordance with the result of the analysis. As described above, the DEMUX 22 detects the specified code in the input stream to establish the synchronization (the synchronization detecting function) and superimposes the stream data on the STC, which is the reference clock of the image processing apparatus 11. When the image data is downloaded, these functions are enabled by the setup of the stream port by the control CPU 23. However, superimposing the stream data on the STC may be disabled in some cases.

When the setup of the stream port is completed, the control CPU 23 transmits a command response (acknowledgment) to the host apparatus 10 through the host interface 21. In Step S204, the host apparatus 10 waits for the command response while determining whether the command response is received or not. If the command response is received from the image processing apparatus 11, then in Step S205, the host apparatus 10 issues a decoding command through the serial port in response to the command response. When the decoding command is received from the host apparatus 10 through the host interface 21, then in Step S206, the control CPU 23 switches to a decoding mode. After the control CPU 23 switches to the decoding mode, the control CPU 23 asserts an interruption signal to the host apparatus 10 through the host interface 21. In Step S207, the host apparatus 10 waits for an interruption while determining whether or not an interruption occurs. If an interruption from the image processing apparatus 11 occurs, then in Step S208 in FIG. 7B, the host apparatus 10 issues a stream start command through the serial port in response to the interruption. In Step S209, the control CPU 23 receives the stream start command from the host apparatus 10 through the host interface 21 and clears the setting of a wait signal in the DEMUX 22.

After clearing the setting of the wait signal, the control CPU 23 transmits a command response (acknowledgement) to the host apparatus 10 through the host interface 21. In Step S210, the host apparatus 10 waits for the command response while determining whether the command response is received or not. If the command response is received from the image processing apparatus 11, then in Step S211, the host apparatus 10 instructs the stream output interface (the bridge 12 in FIG. 1) to transfer the stream of image data in response to the command response. In Step S212, the stream output interface outputs the stream of image data in response to the instruction from the host apparatus 10. In Step S213, the DEMUX 22 in the image processing apparatus 11 receives the stream of the image data, performs the detection of synchronization and the superimposition of the stream data on the STC, etc., and writes the image data in the SDRAM 14 through the SDRAM interface 25. The image data written in the SDRAM 14 functioning as a buffer is subjected to the decoding in the video processor 24.

In Step S214, the host apparatus 10 issues a stream end command when the host apparatus 10 wants to stop the stream of the image data. In Step S215, the control CPU 23 receives the stream end command from the host apparatus 10 through the host interface 21. Then, the control CPU 23 sets the stream port of the DEMUX 22 so as to stop the reception of the stream.

All the operations of the control CPU 23 shown in FIGS. 7A and 7B are controlled by the second firmware. In the manner described above, the control CPU 23 can execute the firmware downloaded through the stream interface (the DEMUX 22) to receive data (image data) to be processed through the stream interface (the DEMUX 22) and to process the received data.

Although the first firmware (the download program) is downloaded from the host apparatus 10 to the image processing apparatus 11 through the host interface 21 in the above embodiment, the first firmware (the download program) may be stored in the ROM 26 for booting in advance and the first firmware (the download program) stored in the ROM 26 for booting may be executed by the control CPU 23 when the image processing apparatus 11 is turned on.

Figure 8:
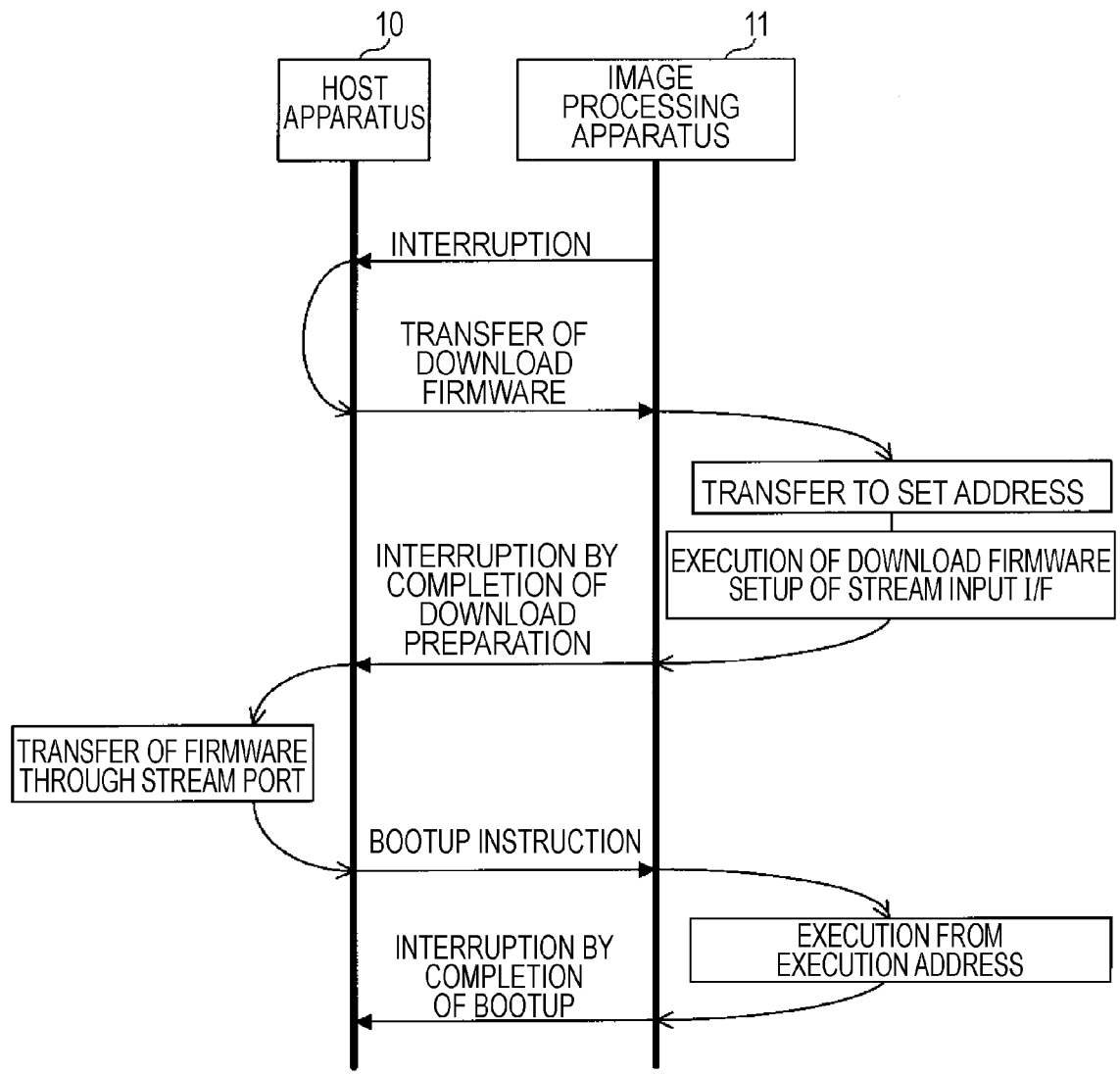
FIG. 8 illustrates an example of a process of downloading a download program and executing the download program to download data processing firmware according to an embodiment.

FIG. 8 illustrates an example of a process of downloading the first firmware (the download program) and executing the first firmware to download the second firmware (the data processing firmware) according to an embodiment. Simplification of the process shown in FIGS. 5A and 5B provides the process shown in FIG. 8 and a detailed description of the process in FIG. 8 is omitted herein.

Figure 9:
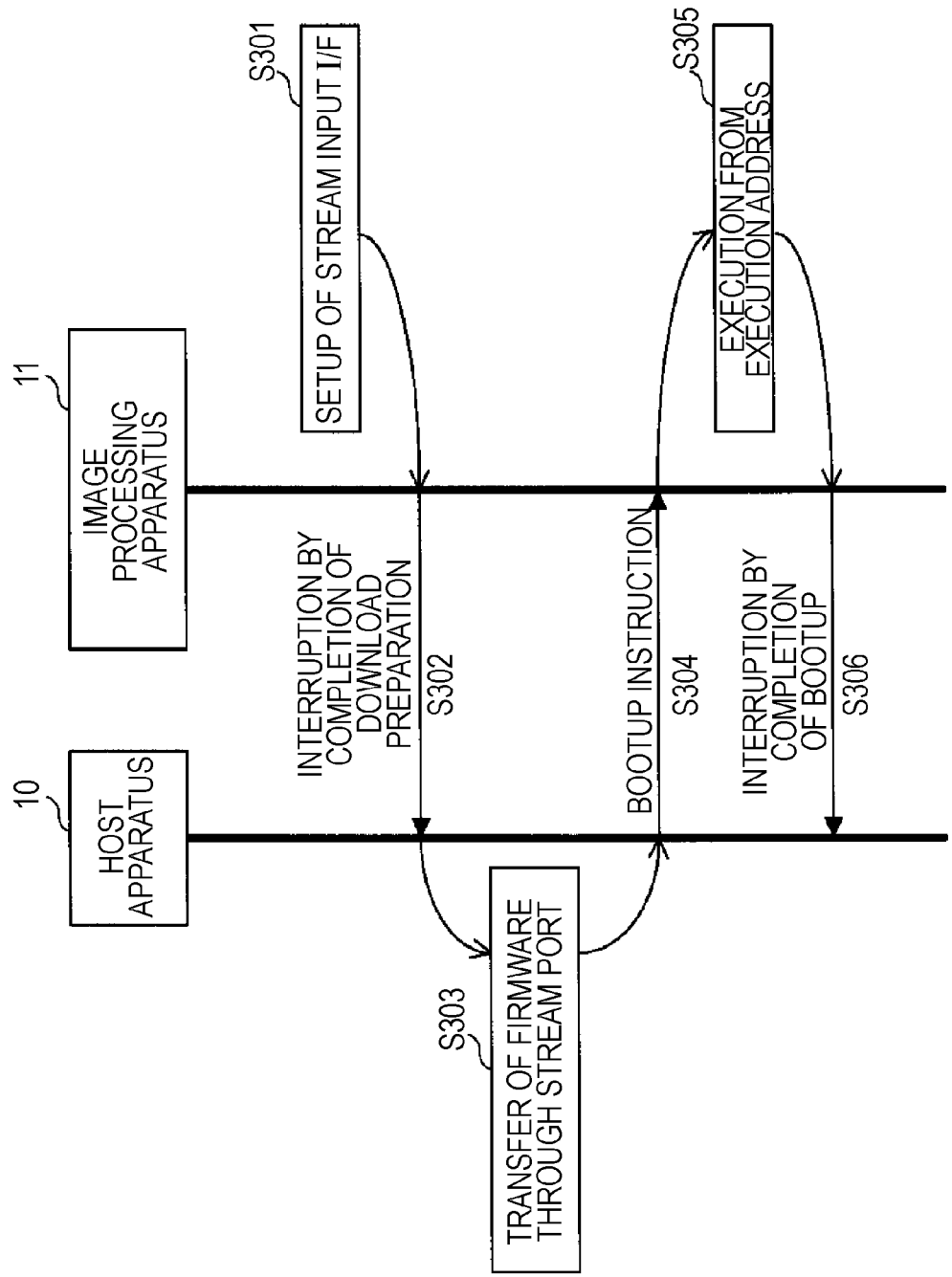
FIG. 9 illustrates an example of a process of storing the download program in a ROM for booting and executing the download program to download the data processing firmware according to an embodiment.

FIG. 9 illustrates an example of a process of storing the first firmware (the download program) in the ROM for booting and executing the first firmware to download the second firmware (the data processing firmware) according to an embodiment. After the image processing apparatus 11 is turned on, the control CPU 23 executes the first firmware stored in the ROM 26 for booting to execute a boot-up sequence. In the boot-up sequence, in Step S301, the control CPU 23 makes various settings concerning a stream input port of the DEMUX 22 in preparation for the download of the firmware through the stream port. After making the various settings, the control CPU 23 asserts an interruption signal concerning the completion of the setup to the host apparatus 10 in Step S302. In Step S303, the host apparatus 10 starts to transfer the firmware through the stream port in response to the interruption. The transferred firmware is sequentially stored in the SDRAM 14. When the transfer of the firmware is completed, then in Step S304, the host apparatus 10 interrupts the image processing apparatus 11 to instruct the boot-up. Upon reception of the interruption to instruct the boot-up from the host apparatus 10, then in Step S305, the image processing apparatus 11 reads out the data of the firmware from the SDRAM 14, analyzes the header, extracts the firmware based on the result of the analysis, and executes the extracted firmware from the specified execution start address. In Step S306, the image processing apparatus 11 notifies the host apparatus 10 of the interruption by the completion of the boot-up by the executed firmware.

As apparent from comparison between the process shown in FIG. 9 and the process shown in FIG. 8, the process in FIG. 9 is similar to the last half of the process in FIG. 8. Specifically, the control CPU 23 executes the first firmware downloaded from the host apparatus 10 through the host interface 21 in the process in FIG. 8 whereas the control CPU 23 executes the first firmware stored in the ROM 26 for booting in the process in FIG. 9. Since the step of downloading the firmware from the host apparatus 10 through the host interface 21 can be omitted in the process in FIG. 9, it is possible to download the second firmware by a simple control process.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
 a control central processing unit;
 a memory;
 a serial interface coupled to a host apparatus to receive a first firmware; and
 a stream interface configured to receive an input stream including data to be processed and a second firmware and transfer the input stream to the memory, the stream interface being different from the serial interface, wherein the first firmware is executed to set, to the stream interface, a stream port for receiving stream data including a second firmware, wherein a download process in which the stream interface set by the first firmware receives the stream data including the second firmware and stores the stream data in the memory is executed in response to an instruction from the control central processing unit, and the control central processing unit analyzes the stream data stored in the memory to extract the second firmware in the memory space and executes the second firmware extracted in the memory space to process the data to be processed, wherein the stream interface detects synchronization upon reception of the input stream including the data to be processed, and the control central processing unit sets the stream interface so as to disable the synchronization detecting function before instructing the execution of the download process.

2. The information processing system according to claim 1, wherein the serial interface coupled to the host apparatus, wherein the control central processing unit receives a the download program from the host apparatus through the serial interface and executes the download program to execute the download process by the stream interface.

3. The information processing system according to claim 2, wherein the download process by the stream interface is executed after the download program is executed to set the port of the stream interface.

4. The information processing system according to claim 1, further comprising:
a read only memory for booting,
wherein the control central processing unit executes a download program stored in the read only memory for booting to execute the download process.

5. The information processing system according to claim 1, wherein the stream interface accesses the memory independently of the control central processing unit to store the stream data in the memory.

6. The information processing system according to claim 1, wherein the control central processing unit does not analyze the content of the stream data when the stream interface receives the stream data and stores the stream data in the memory.

7. The information processing system according to claim 1, wherein the stream data includes data indicating an entry address, which is an execution start address of the firmware, and the control central processing unit analyzes the stream data stored in the memory to extract the firmware in an area beginning with the entry address in the memory space.

8. The information processing system according to claim 7, wherein the stream data further includes data indicating a top address where each block of the firmware is positioned, and the control central processing unit analyzes the stream data stored in the memory to extract each block of the firmware in an area beginning with the top address in the memory space.

9. The information processing system according to claim 1, wherein the stream data including the second firmware is input through the stream interface and is stored in the memory.

10. The information processing system according to claim 1, wherein a header associated with the first firmware is analyzed before the first firmware is stored in the memory and a header associated with the second firmware is analyzed after the second firmware is stored in the memory.

11. A method of executing firmware in an information processing system, the method comprising:
downloading a first firmware via a serial interface;
executing the first firmware to set, to a stream interface, a stream port for receiving stream data including a second firmware, the stream interface being different from the serial interface;
receiving, by the stream interface set by the first firmware, the stream data including the second firmware;
storing the received stream data in a memory;
analyzing, by the control central processing unit, the stream data stored in the memory; and
extracting, by the control central processing unit, the second firmware in the memory space based on the result of the analysis and executing, by the control central processing unit, the second firmware extracted in the memory space,
wherein a function of the stream interface is disabled when downloading the second firmware, the function of the stream interface including at least one of a synchronization detection function and a data superposition function.

12. The method according to claim 11, wherein the stream data including the second firmware is input through the stream interface and is stored in the memory.

13. The method according to claim 11, further comprising disabling a certain function of the stream interface when downloading the second firmware.

14. The method according to claim 13, wherein the certain function of the stream interface includes at least one of a synchronization detection function and a data superposition function.

15. The method according to claim 11, wherein a header associated with the first firmware is analyzed before the first firmware is stored in the memory and a header associated with the second firmware is analyzed after the second firmware is stored in the memory.

* * * * *